United States Patent
Coffey et al.

(10) Patent No.: US 11,438,208 B1
(45) Date of Patent: Sep. 6, 2022

(54) METHOD AND APPARATUS FOR FREQUENCY RECONSTRUCTION OF GATED IN-PHASE AND QUADRATURE DATA

(71) Applicant: L3Harris Technologies, Inc., Melbourne, FL (US)

(72) Inventors: Calvin A. Coffey, McKinney, TX (US); Christopher T. Osterwise, Greenville, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

(21) Appl. No.: 17/484,293

(22) Filed: Sep. 24, 2021

(51) Int. Cl.
H04L 27/26 (2006.01)

(52) U.S. Cl.
CPC ...... H04L 27/265 (2013.01); H04L 27/26526 (2021.01)

(58) Field of Classification Search
CPC ......... H04L 27/06; H04L 27/14; H04L 27/22; H04L 27/2647; H04L 27/2649; H04L 27/265; H04L 27/26526
USPC ............... 375/260, 261, 268, 316, 320, 340; 370/208, 210; 708/403–405
See application file for complete search history.

(56) References Cited

U.S. PATENT DOCUMENTS

| | | | |
|---|---|---|---|
| 7,254,191 B2 * | 8/2007 | Sugar | H04L 1/1664 375/228 |
| 7,436,912 B2 | 10/2008 | Fudge et al. | |
| 8,121,222 B2 | 2/2012 | Boyle et al. | |
| 2007/0086544 A1 | 4/2007 | Fudge et al. | |
| 2010/0067710 A1 * | 3/2010 | Hendriks | G10L 21/0208 381/58 |
| 2021/0273677 A1 | 9/2021 | Fudge et al. | |

OTHER PUBLICATIONS

Maleh, R., et al., "Analog-to-Information and the Nyquist Folding Receiver", IEEE Journal on Emerging and Selected Topics in Circuits and Systems, vol. 2, No. 3, pp. 564-578 (Sep. 2012).

* cited by examiner

*Primary Examiner* — Young T. Tse
(74) *Attorney, Agent, or Firm* — Edell, Shapiro & Finnan, LLC

(57) ABSTRACT

A method comprises: digitizing a signal to produce a reference frame of amplitude samples in a time-domain; generating a spectrogram that includes energy content of the reference frame, represented by amplitude and phase, across frequency and time of the spectrogram; detecting regions of the spectrogram that have energy levels greater than a threshold level to produce detected regions; copying energy content from the detected regions into an energy vector; and performing an Inverse Fourier transform (IFT) based on the energy vector to transform the energy vector into in-phase (I) and quadrature (Q) (IQ) samples in the time-domain.

20 Claims, 8 Drawing Sheets

METHOD AND APPARATUS FOR FREQUENCY RECONSTRUCTION OF GATED IN-PHASE AND QUADRATURE DATA

TECHNICAL FIELD

The present disclosure relates to generating gated in-phase (I) and quadrature-phase (Q) (IQ) samples from raw input samples.

BACKGROUND

Digital representation of complex radio frequency (RF) data enables substantial capabilities in the processing of RF data for detection, classification, and geolocation of emitters. Through temporal, spectral, and time-frequency representations, data structures can be extracted for accurate analysis. Digital data is commonly represented with streams of complex samples, in IQ or complex analytic format. A significant limitation with complex time-series representations is movement and storage of the samples within an analysis receiver. To mitigate this, data is typically stored as efficiently as possible by gating, filtering, and decimating when possible.

In applications that employ substantial near real-time processing, time-series data may be required to exist simultaneously with spectral and time-frequency representations. This can become a serious resource bottleneck and impose limitations on processing and performance. For example, a conventional technique converts analog-to-digital converter (ADC) samples to IQ (i.e., complex) samples, converts the IQ samples to a spectrogram, and then returns to the (saved) IQ samples for further analysis based on areas of interest on the spectrogram. The aforementioned cycle must occur before thinning (e.g., filtering and decimating) of either the IQ samples or the spectrogram data can be performed, and thus requires large memory buffers. Moreover, generating the IQ samples using the conventional technique does not allow easy capture of simultaneous signals at multiple frequencies, and generates IQ samples when no excitation signal is present because the IQ samples are not gated in time, which wastes memory.

DESCRIPTION OF EXAMPLE EMBODIMENTS

Overview

Figure 1:
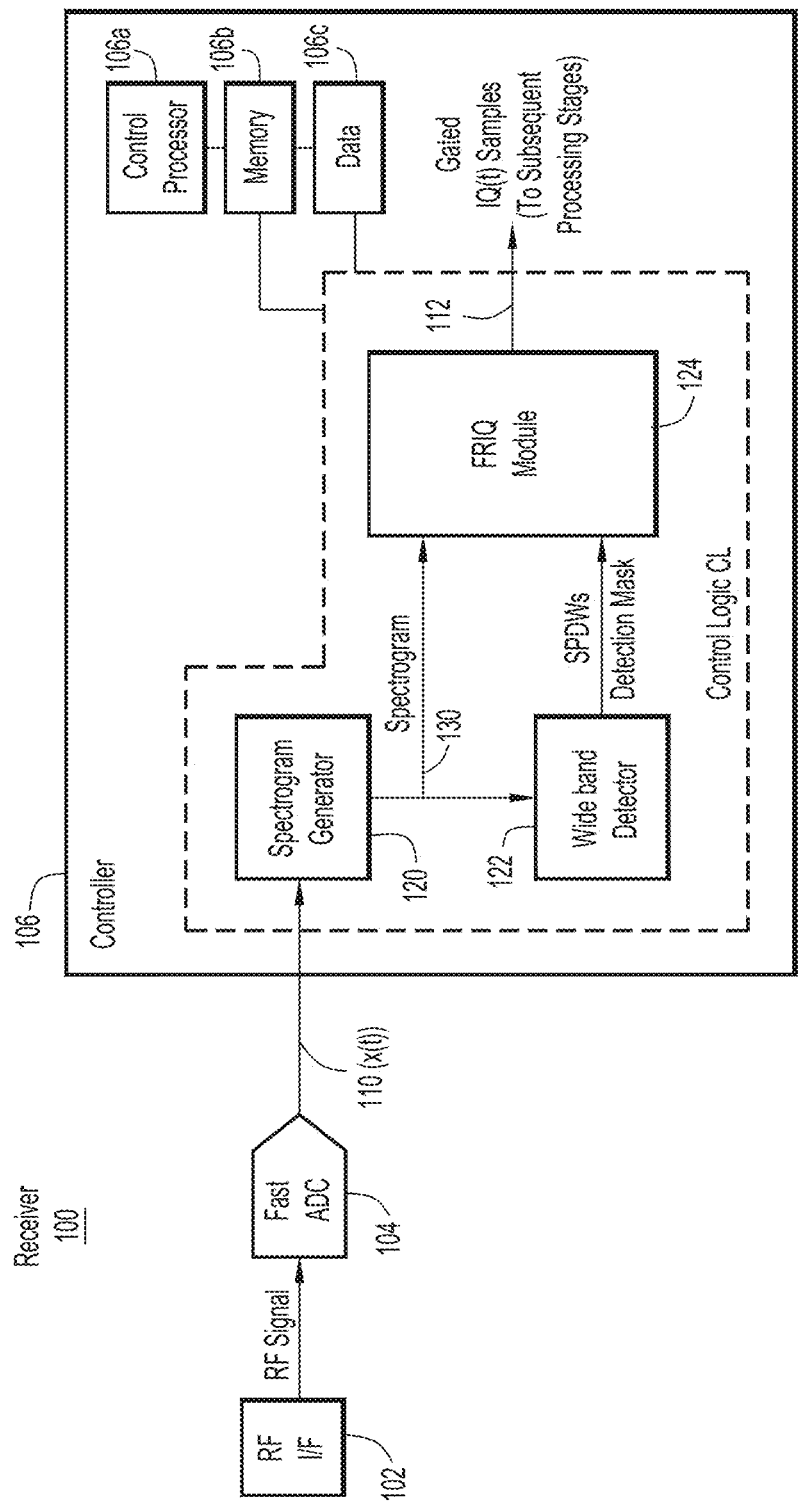
FIG. 1 is a block diagram of an example receiver in which frequency reconstruction of gated in-phase (I) and quadrature-phase (Q) data (FRIQ) may be implemented.

In an embodiment, a method comprises: digitizing a signal to produce a reference frame of amplitude samples in a time-domain; generating a spectrogram that includes energy content of the reference frame, represented by amplitude and phase, across frequency and time of the spectrogram; detecting regions of the spectrogram that have energy levels greater than a threshold level to produce detected regions; copying energy content from the detected regions into an energy vector; and performing an Inverse Fourier transform (IFT) based on the energy vector to transform the energy vector into in-phase (I) and quadrature (Q) (IQ) samples in the time-domain.

Example Embodiments

Embodiments presented herein are directed to frequency reconstruction of gated in-phase (I) and quadrature-phase (Q) data (FRIQ). At a high-level, the FRIQ includes operations to form a time-frequency spectrogram from analog-to-digital converter (ADC) samples, and invert the spectrogram to generate the gated IQ data. Additionally, the operations carefully window and overlap successive time bins to form the spectrogram, so that the gated IQ data can be reconstructed using an Inverse Fast Fourier Transform (IFFT) on an energy stream or content in each time bin. Subsequent operations may append energy from the time bins in a way that accounts for energy overlap.

The FRIQ offers technical improvements over conventional techniques. The FRIQ provides a fast and efficient route from raw ADC samples to a spectrogram (i.e., the raw ADC samples are converted directly to the spectrogram), and then from the spectrogram to gated IQ data. The FRIQ performs direct reconstruction of the gated IQ data from the spectrogram, without reference to either the raw ADC samples or "full-band" IQ data (i.e., IQ data that has not been thinned by filtering, for example), which eliminates unnecessary data storage and movement. Thus, the FRIQ results in a near lossless and invertible time-frequency representation of digital data that eliminates the conversion of ADC samples to IQ samples before performing signal detection, eliminates the need to store IQ samples in the manner employed by conventional techniques, and offers an opportunity for improvements in processing and filtering. Thus, the FRIQ offers the following advantages and technical improvements over the conventional techniques, including:

a. Providing more efficient processing by using less memory, e.g., by eliminating the need to keep IQ samples generated from raw ADC samples in addition to spectrogram data in an application such as precision measurement processing, for example.

b. Employing spectrogram-based filtering of RF samples using narrowband filters that follow time-frequency trajectories of signals.

c. Using a parallel architecture, which is optimal for General-Purpose Graphics Processing Unit (GPGPU) (or software) digital receiver implementations.

d. Minimizing movement of data without losing information, which speeds detection and measurement of time critical signals.

FIG. 1 is a block diagram of an example receiver 100 in which FRIQ embodiments may be implemented. Receiver 100 includes an RF interface (I/F) 102, a fast/high-bandwidth ADC 104, and a controller 106. RF interface 102 may include an antenna to receive an RF signal wirelessly, or an RF connector configured to receive the RF signal via a wired interface. The RF signal may range in frequency from a few Hertz (Hz) up to many GHz, for example. RF interface 102 passes the (received) RF signal to an input of ADC 104. ADC 104 samples the RF signal at the Nyquist rate for the highest frequency present in the RF signal. ADC 104 digitizes or samples the RF signal directly, to produce a sequence of periodically spaced amplitude samples 110 in the time-domain (referred to as "time-domain samples" x(t) or a "sampled signal" x(t)). The samples are considered "raw" samples because they do not include both I and Q samples, i.e., the raw samples are not complex samples.

Figure 2:
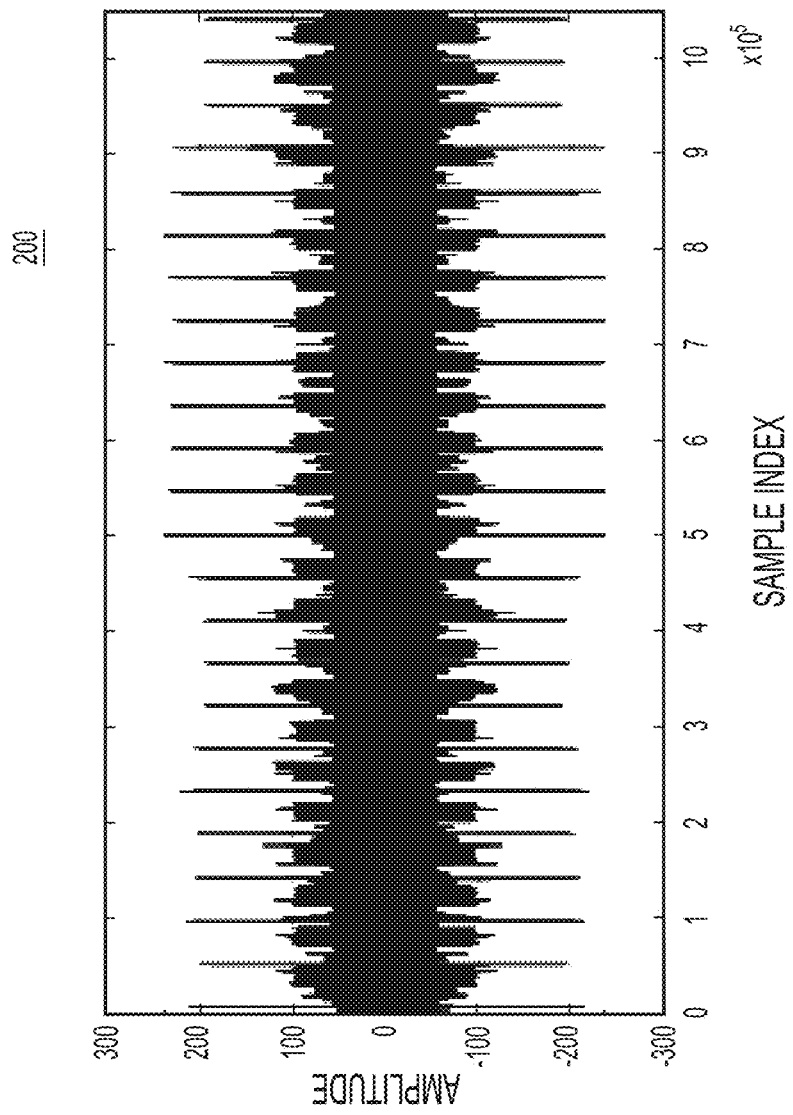
FIG. 2 is an amplitude vs. time waveform of an example sampled RF signal from which gated IQ data may be generated by the FRIQ.

With reference to FIG. 2, there is shown an amplitude vs. time waveform 200 of time-domain samples x(t). In the example of FIG. 2, time is represented as a "sample index." Returning to FIG. 1, ADC 104 provides time-domain samples x(t) to controller 106. Controller 106 processes time-domain samples x(t) according to the FRIQ embodiments, to produce gated IQ data 112 in the time-domain. An example of gated IQ data 112 is described below in connection with FIG. 7. Controller 106 provides gated IQ data 112 to subsequent signal processing stages (not shown), such as signal detection and filtering stages, which process the gated IQ data for various purposes.

Controller 106 includes a processor 106a and memory 106b. Processor 106a may include a microcontroller or microprocessor, for example, configured to execute software instructions stored in memory 106b. Memory 106b may comprise read only memory (ROM), random access memory (RAM), or other physical/tangible (e.g., non-transitory) memory storage devices. Thus, in general, memory 106b may comprise one or more computer readable storage media (e.g., a memory device) encoded with software comprising computer executable instructions that, when executed by processor 106a, cause the processor to perform operations described herein. For example, memory 106b stores or is encoded with instructions for control logic CL (described below) to perform the operations described herein.

Memory 106b also stores information/data 106c used and generated by the control logic.

Controller 106 implements control logic (modules) CL, including a spectrogram generator 120, a wideband detector 122, and an FRIQ module 124 configured to communicate with each other. Spectrogram generator 120 collects a predetermined number, or duration, of time-domain samples x(t) referred to as a reference frame. For example, waveform 200 of FIG. 2 may represent such a reference frame. Spectrogram generator 120 generates a frequency-domain complex amplitude spectrogram 130 from the reference frame. Spectrogram 130 represents energy content of the reference frame, in terms of amplitude (e.g., voltage) and phase, across frequency bins that range from a minimum frequency bin to a maximum frequency bin and time bins that range from a minimum time bin to a maximum time bin. That is, spectrogram 130 is a three-dimensional (3D) graph that represents energy content of the reference frame across frequency and time. A "frequency bin" is an indexed frequency segment of a predetermined frequency bandwidth centered at a particular (indexed) frequency along a frequency axis of spectrogram 130. Similarly, a "time bin" is an indexed time segment of a predetermined time duration centered at a particular (indexed) time along a time axis of spectrogram 130.

Figure 3:
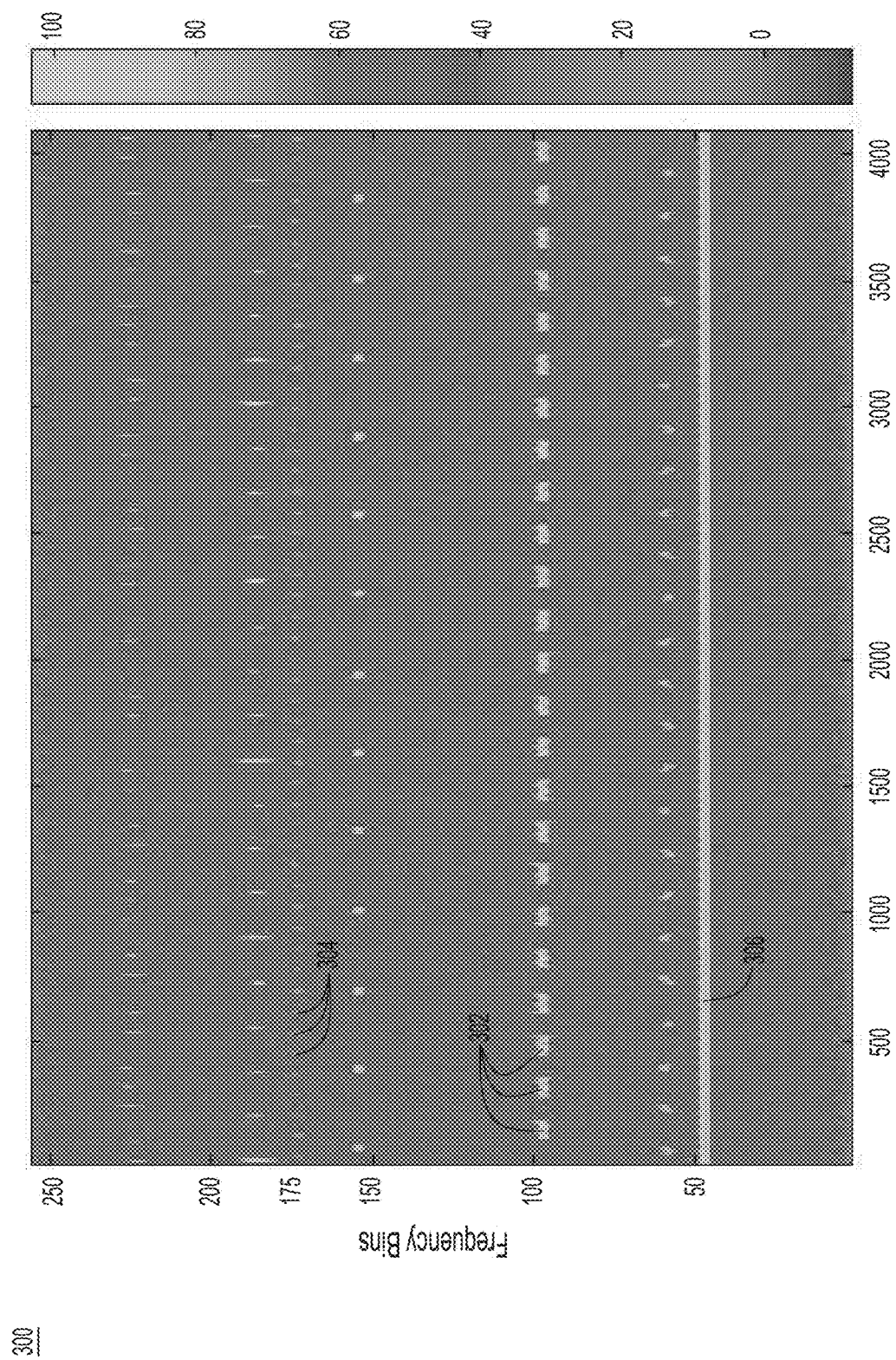
FIG. 3 is an illustration of an example time-frequency spectrogram generated from the sampled RF signal of FIG. 2.

With reference to FIG. 3, there is an illustration of an example spectrogram 300 generated from a reference frame. Spectrogram 300 includes frequency bins along a vertical axis, and time bins along a horizontal axis. Spectrogram 300 represents energy content (or simply "energy") in gray scale at intersections of the frequency and time bins; the lighter the intensity, the greater the energy, and vice versa. Spectrogram 300 may be considered a matrix having frequency bins for rows and time bins for columns, and energy content (e.g., amplitude and phase) at the intersections of the rows and columns.

By way of example, spectrogram 300 shows a sequence of time-spaced (i.e., time-separated) relatively high-energy detected regions 302 for frequency bin 100, a sequence of time-spaced relatively high-energy detection regions 304 for frequency bin 175, and a continuous-time relatively high-energy detection region 306 at frequency bin 50, and so on. Spectrogram 300 also shows large relatively low-energy regions surrounding/between the high-energy regions.

Returning to FIG. 1, spectrogram generator 120 may perform the following example operations to generate spectrogram 130:

a. Create a matrix in which each column is a time window (i.e., time bin) of input and, for each column, perform next operations (b)-(f).

b. Arrange the time windows such that neighboring time windows overlap each other by 50% of a width of a time window.

c. Multiply combined/overlapping samples from the reference frame that occupy the overlap regions of the time windows by windowing coefficients.

d. Perform a short time Fourier transform (STFT) on all columns simultaneously.

e. Divide STFT output values (which are frequency-domain values) in the columns by a common scaling factor NFFT, which is a length of the FFT used in the STFT.

f. Discard negative frequencies.

Wideband detector 122 receives spectrogram 130. Wideband detector 122 computes/determines a threshold level of energy based on an overall energy content in spectrogram 130. For example, wideband detector 122 calculates an energy of each pixel of the spectrogram (i.e., energy across the spectrogram), estimates background noise based on spectrogram energy (e.g., all of the pixel energies), and then computes the energy threshold based on the estimate of background noise (i.e., the background noise estimate) and a desired/target probability of false alarm. Next, wideband detector 122 identifies/detects all areas of spectrogram 130 that have energy levels greater than the threshold level, and groups all such detected areas regions into connected regions, referred to as "detection regions" of the spectrogram. The detected regions of spectrogram 130 have energy levels greater than the threshold level. All other regions of the spectrogram have energy levels that are equal to or less than the threshold level.

Wideband detector 122 generates spectrogram descriptor words (SPDWs) (also referred to as "detected region descriptors" or simply "descriptors") that define the detected regions in terms of frequency spans (e.g., a span of frequency bins or bandwidth (BW)) and time spans/durations (e.g., a span of time bins) that the detected regions occupy. For example, the SPDWs include start/stop times (i.e., time duration delimiters) and minimum/maximum frequencies (i.e., frequency bandwidth delimiters) for the detected regions. The SPDWs identify/locate their corresponding detected regions on spectrogram 130, such that energy content specific to a given detected region may be accessed using the SPDW for the given detected region. That is, the SPDWs may be used as frequency and time bin indexes that specifically locate energy content in the detected regions, as defined by the SPDWs.

Figure 4:
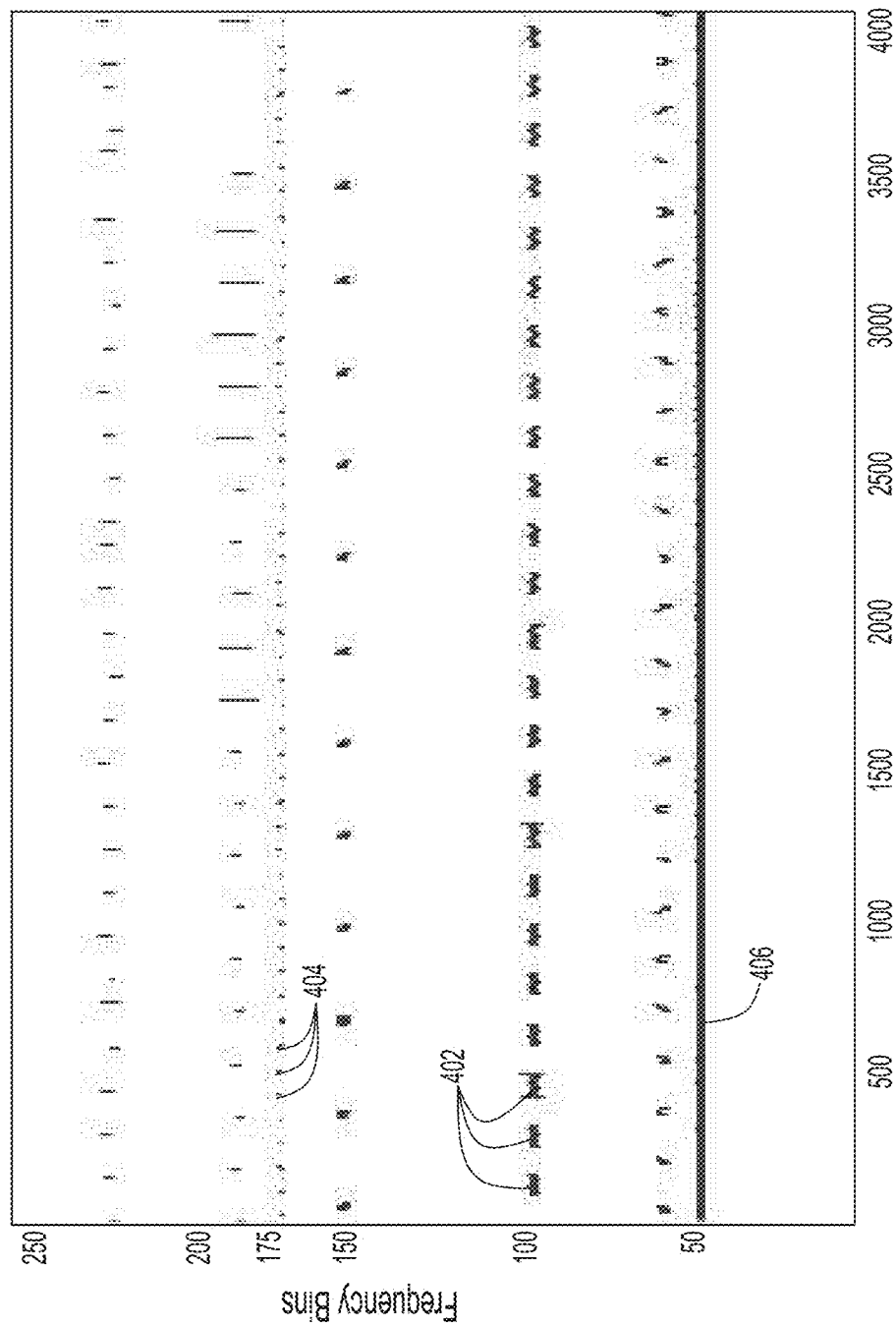
FIG. 4 is an illustration of an example detection mask derived from the spectrogram of FIG. 3.

The SPDWs collectively represent, or may be visualized as, a detection mask derived from spectrogram 130. FIG. 4 is an illustration of an example detection mask 400 derived from spectrogram 300 by wideband detector 122. Detection mask 400 shows indications of detected regions plotted against frequency bins and time bins. For example, detection mask 400 includes a sequence of time-spaced indications of detected regions 402 for frequency bin 100 (corresponding to the sequence of detected regions 302 in spectrogram 300), a sequence of time-spaced indications of detected regions 404 at frequency bin 175 (corresponding to sequence 304), a continuous-time indication of detected region 406 at frequency bin 50 (corresponding to 306), and so on. In many instances, the detected regions are separated (e.g., non-overlapping) from each other in frequency, time, or both frequency and time. That is, there are substantial frequency and time gaps between many of the detected regions. The gaps represent non-detected regions of relatively low (or zero) energy on spectrogram 130 compared to the detected regions, which have relatively high energy.

Figure 5:
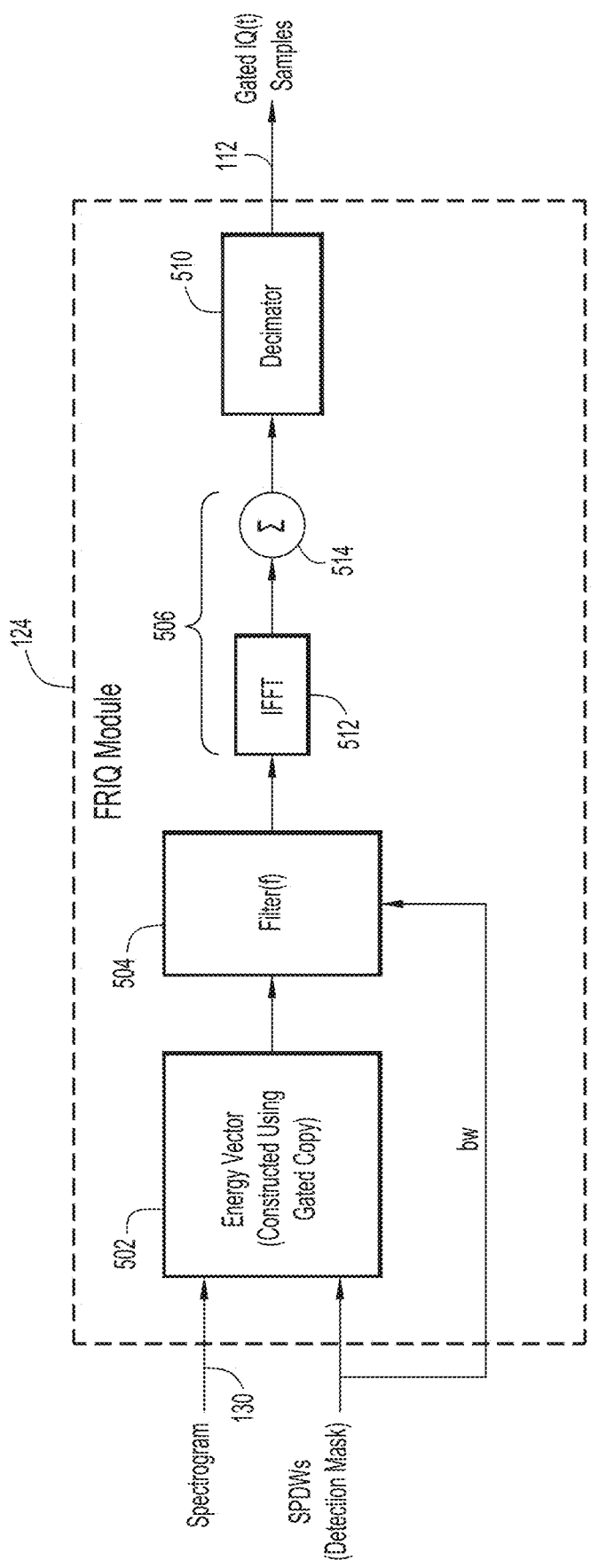
FIG. 5 is a block diagram of an example FRIQ module of FIG. 1.

FRIQ module 124 receives spectrogram 130 and the SPDWs (e.g., the detection mask). FRIQ module 124 performs frequency reconstruction of gated IQ data 112 representative of the reference frame, based on spectrogram 130 and the SPDWs. That is, FRIQ module 124 generates gated IQ data 112 based on spectrogram 130 and the SPDWs. FIG. 5 is a block diagram of operations performed by FRIQ module 124, according to an embodiment. FRIQ module 124 includes an energy vector 502 constructed using a gated copy operation (referred to simply as a "gated copy") that receives spectrogram 130 and the SPDWs, an optional filter operation 504, a frequency-reconstruction-of-IQ operation 506, and an optional decimator operation 510.

The gated copy traverses the SPDWs to identify/locate energy content of all of the detected regions of spectrogram 130. As part of the traversal, the gated copy copies energy content only from the detected regions and, in some embodiments, from limited/narrow guard bands of the spectrogram bordering or surrounding the detected regions, and stores the copied energy content into energy vector 502, which comprises a collected memory region of FRIQ module 124. A guard band may have a width of one frequency bin or one time bin, for example. The gated copy does not copy energy content that falls into gap regions between the detected regions, i.e., energy content that falls outside of the detected regions (and the guard bands, if used). Because the copied energy content (i) is limited to energy content contained within/bounded/delimited by the frequency span and the time span of each detected region as defined/delimited by the corresponding SPDW (and, optionally, additional energy content that is within the narrow guard band bordering each detected region), and (ii) does not include (lower) energy content that falls outside of the aforementioned regions (i.e., that falls in the gap regions), the copied energy content is said to be "gated" or "delimited" energy content in terms of frequency and time. In other words, the gated energy content is gated in frequency and time according to the frequency and time delimiters of the SPDWs.

Figure 6:
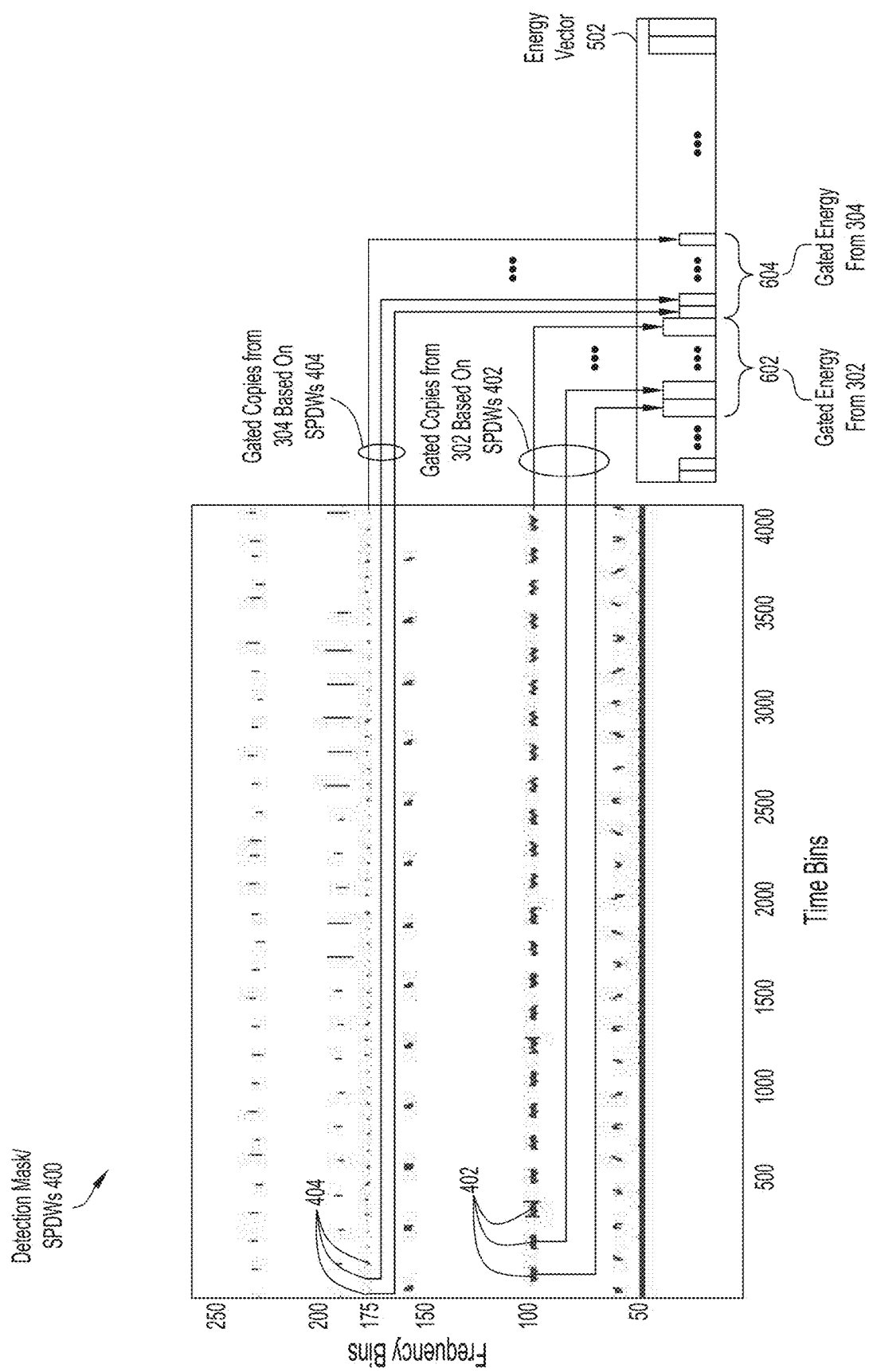
FIG. 6 is an illustration of an example of constructing an energy vector using a gated copy performed by the FRIQ module on the spectrogram of FIG. 3 using the detection mask of FIG. 4.

FIG. 6 is an illustration of an example of energy vector 502 that is constructed using the gated copy to copy a portion of gated energy content from detected energy regions of spectrogram 300 into the energy vector based on SPDWs represented by detection mask 400. FIG. 6 is described also with reference to spectrogram 300 of FIG. 3. With a focus on frequency bin 100, the gated copy first identifies successive, spaced-apart, detected regions 402 of (i.e., that intersect with) frequency bin 100 based on the SPDWs. Then, the gated copy copies the (gated) energy content from the identified detected regions 402 of frequency bin 100 from spectrogram 300 (e.g., from detected regions 302 of spectrogram 300 corresponding to detected regions 402) into corresponding contiguous segments 602 of energy vector 502, as shown. The gated copy moves to a next frequency bin of lower frequency that intersects one or more detected regions, e.g., frequency bin 175. The gated copy identifies successive, spaced-apart, detected regions 404 of frequency bin 175 based on the SPDWs. Then, the gated copy copies the gated energy content from the identified detected regions of frequency bin 175 from spectrogram 300 into corresponding contiguous segments 604 of energy vector 502 that are contiguous with segments 602, as shown.

This process repeats for successive frequency bins that intersect detected regions. The gated copy traverses all of the SPDWs/detected regions to copy their gated energy content into contiguous segments of energy vector 502 frequency bin-by-frequency bin in succession, and time bin-by-time bin in succession, until the gated energy content contained in all of the detected regions (which may be expanded to include bordering guard bands) has been copied into energy vector 502.

In summary, for each of the detected regions indicated by the SPDWs, the gated copy copies respective gated energy content to common contiguous memory (e.g., a memory buffer allocated for energy vector 502). The gated copy simultaneously effects:
  a. Frequency downshifting because detected regions of the spectrogram may be copied from arbitrary frequency rows to frequency rows of lower frequency.
  b. Low-pass frequency filtering and gating in frequency because only frequency bins surrounding detected regions are copied to the memory buffer.
  c. Gating in time because only time bins surrounding detected regions are copied to the memory region.
  d. Down-sampling because energy content from less than all of the frequency bins of the spectrogram is presented to subsequent FRIQ processing operations (described below), which produces a lower-sampled output in terms of gated IQ data.

Once the gated copy traverses all of the SPDWs and performs the gated copies as described above, the gated copy is complete, and the spectrogram may be discarded.

Returning to FIG. 5, the gated copy provides the energy vector 502 to filter operation 504, which is prior to frequency-reconstruction-of-IQ operation 506. Filter operation 504 performs multiplicative frequency-domain filtering based on the energy vector (i.e., on the gated energy content) to produce filtered gated energy content. In an example, the filtering may multiply a rectangular window (in the frequency domain) of a size selected by a bandwidth parameter "bw," which may be centered along a row of maximum energy detection, for example. The filtering performs a frequency downshift of the filtered data to baseband, i.e., the filtering produces baseband data. In some embodiments, filter operation 504 may be omitted.

Next, frequency-reconstruction-of-IQ operation 506 operates on the filtered gated energy content to invert the STFT transformation that produced spectrogram 130. More specifically, operation 506 includes an IFFT operation 512 followed by an overlap-add operation 514. IFFT operation 512 performs an IFFT on the filtered gated energy content to produce gated IQ data in the time-domain. This operation effectively performs IFFT operations on columns of gated energy content corresponding to columns of spectrogram 130, simultaneously. Overlap-add operation 514 performs an overlap-add to combine the inverted columns into a single output vector containing intermediate gated IQ data in the time domain. Then, decimator operation 510 decimates the intermediate gated IQ data in the time domain to eliminate unneeded data, and produce gated IQ data 112. In some embodiments, decimator operation 510 may be omitted.

Figure 7:
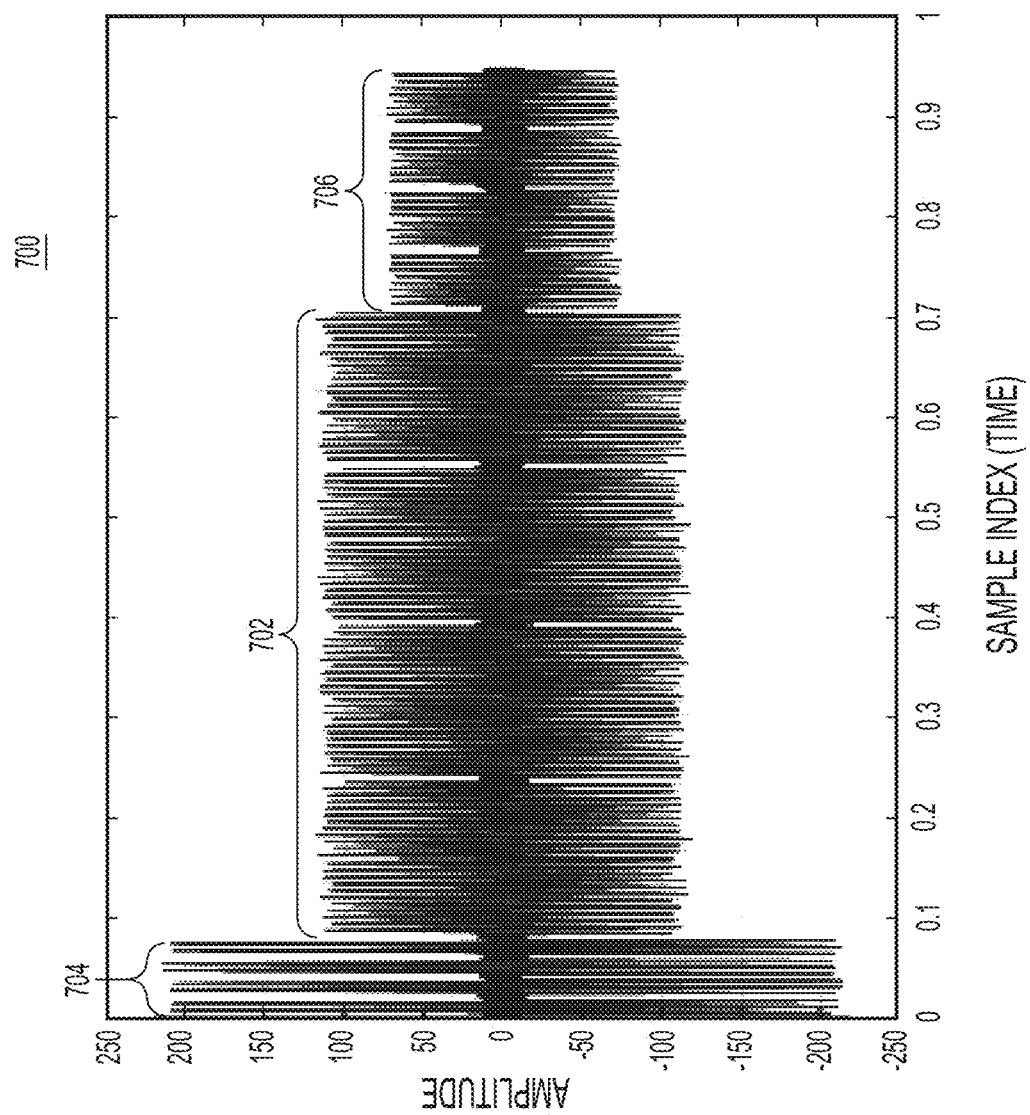
FIG. 7 is an amplitude vs. time waveform of example gated IQ data (i.e., gated IQ samples) generated by the FRIQ module.
Figure 8:
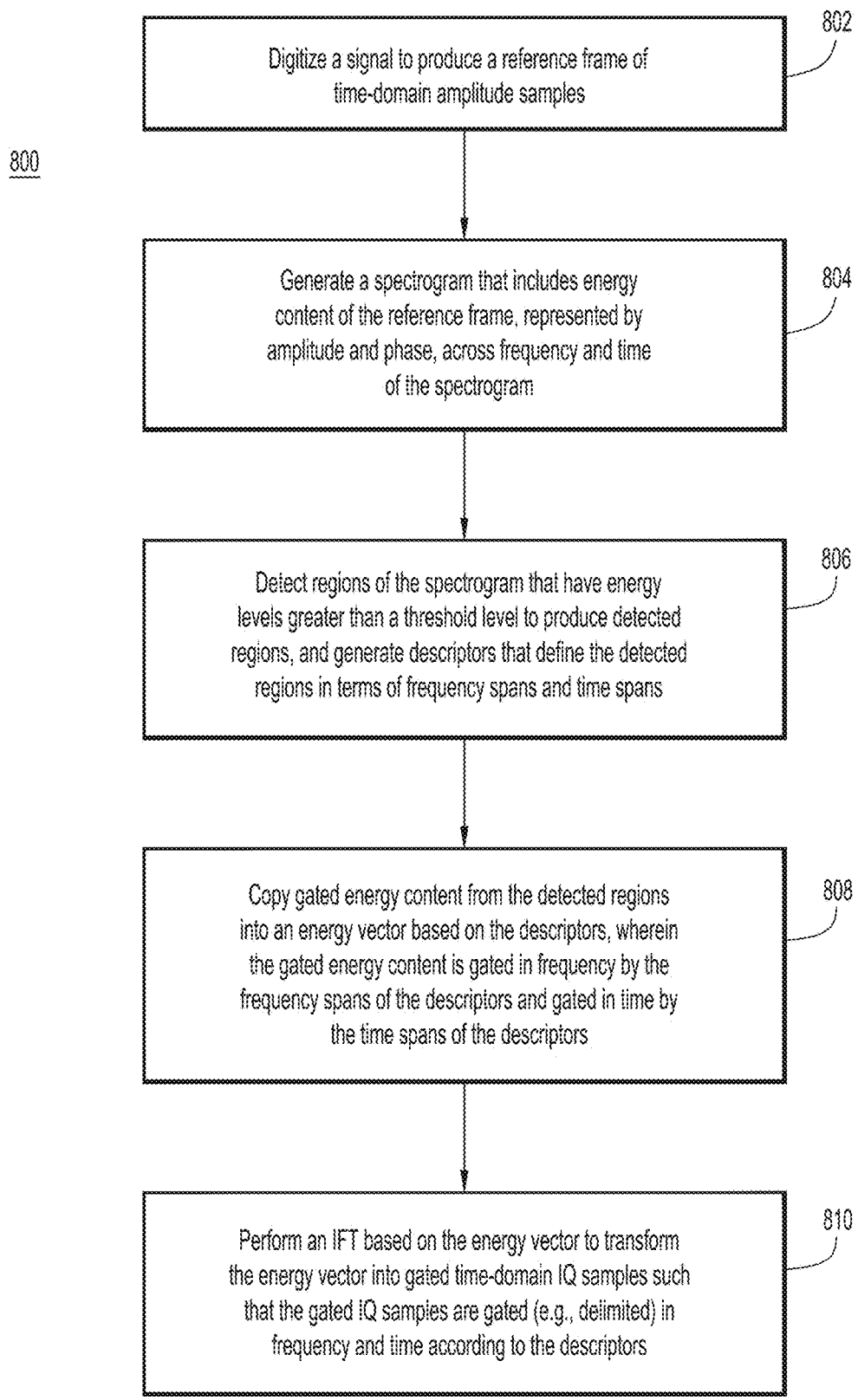
FIG. 8 is a flowchart of an example method of performing frequency reconstruction of gated IQ data.

FIG. 7 is an example amplitude vs. time waveform 700 of gated IQ data 112 generated by FRIQ module 124. While gated IQ data typically includes many gated pulses, only four such gated pulses are shown in FIG. 8, for clarity. Waveform 700 of gated IQ data (i.e. samples) include first, second, and third (gated) successive time segments 704, 702, and 706 for gated times/spans 0-0.08, 0.08-0.7, and 0.7-0.95, respectively. Each of the segments contains corresponding gated time and gated frequency content, as shown.

FIG. 8 is a flowchart of an example method 800 of performing frequency reconstruction of gated IQ data. Operations of method 800 are described above. The operations may be performed in a receiver.

At 802, an ADC of the receiver digitizes a received signal (e.g., an RF signal) to produce a reference frame of amplitude samples in the time-domain. The samples are raw samples that do not include I and Q samples.

At 804, a controller of the receiver generates a spectrogram that includes energy content of the reference frame, represented by amplitude and phase, across frequency (e.g., frequency bins) and time (e.g., time bins) of the spectrogram. To do this, the controller performs an STFT on the reference frame.

At 806, the controller detects regions of the spectrogram that have energy levels greater than a threshold level to produce detected regions, and generates descriptors that define the detected regions in terms of frequency spans and time spans.

At 808, the controller copies gated energy content (i.e., performs gated copying) from the detected regions into an energy vector based on the descriptors. The gated energy content is gated/delimited in frequency by the frequency spans of the descriptors and gated/delimited in time by the time spans of the descriptors. The copy operation may copy the gated energy content only from the detected regions and from limited guard bands that border or surround the detected regions, for example, but not from regions of the spectrogram that are outside of the limited guard bands and the detected regions. The gated energy content may be copied from particular frequencies of the spectrogram that intersect the detected regions into contiguous segments of the energy vector, on a frequency-by-frequency (e.g., frequency bin-by-frequency-bin) basis, and on a time-by-time (e.g., a time bin-by-time-bin) basis.

At 810, the controller performs an Inverse Fourier Transform (IFT) (e.g., an IFFT) based on the energy vector to transform the energy vector into gated time-domain IQ samples. The gated time-domain samples are gated in frequency and time in accordance with the descriptor delimiters, i.e., as a result of the gated copying of 808.

In summary, in one aspect, an apparatus is provided comprising: a memory; an analog-to-digital converter (ADC) to digitize a signal to produce, and store in the memory, a reference frame of amplitude samples in a time-domain; and a processor coupled to the ADC and the memory and configured to perform: generating a spectrogram that includes energy content of the reference frame, represented by amplitude and phase, across frequency and time of the spectrogram; detecting regions of the spectrogram that have energy levels greater than a threshold level to produce detected regions; copying energy content from the detected regions into an energy vector; and performing an Inverse Fourier transform (IFT) based on the energy vector to transform the energy vector into in-phase (I) and quadrature (Q) (IQ) samples in the time-domain.

In another aspect, a method is provided comprising: digitizing a signal to produce a reference frame of amplitude samples in a time-domain; generating a spectrogram that includes energy content of the reference frame, represented by amplitude and phase, across frequency and time of the spectrogram; detecting regions of the spectrogram that have energy levels greater than a threshold level to produce detected regions; copying energy content from the detected regions into an energy vector; and performing an Inverse Fourier transform (IFT) based on the energy vector to transform the energy vector into in-phase (I) and quadrature (Q) (IQ) samples in the time-domain.

In another aspect, a non-transitory computer readable medium is provided. The computer readable medium is encoded with instructions that, when executed by a processor/controller, cause the processor/controller to perform: receiving a reference frame of amplitude samples of a receive signal in a time-domain; generating a spectrogram that includes energy content of the reference frame, represented by amplitude and phase, across frequency and time of the spectrogram; detecting regions of the spectrogram that have energy levels greater than a threshold level to produce detected regions; copying energy content from the detected regions into an energy vector; and performing an Inverse Fourier transform (IFT) based on the energy vector to transform the energy vector into in-phase (I) and quadrature (Q) (IQ) samples in the time-domain.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   digitizing a signal to produce a reference frame of amplitude samples in a time-domain;
   generating a spectrogram that includes energy content of the reference frame, represented by amplitude and phase, across frequency and time of the spectrogram;
   detecting regions of the spectrogram that have energy levels greater than a threshold level to produce detected regions;
   copying energy content from the detected regions into an energy vector; and
   performing an Inverse Fourier transform (IFT) based on the energy vector to transform the energy vector into in-phase (I) and quadrature (Q) (IQ) samples in the time-domain.

2. The method of claim 1, wherein the amplitude samples do not include IQ samples.

3. The method of claim 1, further comprising:
generating descriptors that define the detected regions in terms of frequency spans and time spans,
wherein copying includes copying gated energy content from the detected regions into the energy vector based on the descriptors, wherein the gated energy content is gated in frequency by the frequency spans of the descriptors and gated in time by the time spans of the descriptors, and
wherein the IQ samples are gated IQ samples that are gated in frequency and time.

4. The method of claim 3, wherein copying includes copying the gated energy content only from the detected regions and from limited guard bands that border the detected regions, but not from regions of the spectrogram that are outside of the limited guard bands.

5. The method of claim 3, wherein copying includes copying the gated energy content from the frequency spans and the time spans of the detected regions into contiguous segments of the energy vector.

6. The method of claim 5, wherein copying further includes copying the gated energy content from particular frequencies of the spectrogram that intersect the detected regions into the contiguous segments of the energy vector, frequency-by-frequency, and time-by-time.

7. The method of claim 3, wherein the descriptors each includes minimum and maximum frequencies and start and stop times on the spectrogram that delimit a corresponding detected region of the detected regions.

8. The method of claim 3, wherein the detected regions include non-overlapping detected regions that are separated from each other in frequency and time.

9. The method of claim 1, further comprising:
estimating background noise based on spectrogram energy to produce a background noise estimate; and
determining the threshold level based on the background noise estimate and a target probability of false alarm for detecting the regions of the spectrogram that have the energy levels greater than the threshold level.

10. The method of claim 1, further comprising:
prior to performing the IFT, frequency-filtering the energy vector in a frequency domain to produce a filtered energy vector,
wherein performing the IFT includes performing the IFT on the filtered energy vector.

11. The method of claim 10, further comprising:
decimating the IQ samples.

12. An apparatus comprising:
a memory;
an analog-to-digital converter (ADC) to digitize a signal to produce, and store in the memory, a reference frame of amplitude samples in a time-domain; and
a processor coupled to the ADC and the memory and configured to perform:
generating a spectrogram that includes energy content of the reference frame, represented by amplitude and phase, across frequency and time of the spectrogram;
detecting regions of the spectrogram that have energy levels greater than a threshold level to produce detected regions;
copying energy content from the detected regions into an energy vector; and
performing an Inverse Fourier transform (IFT) based on the energy vector to transform the energy vector into in-phase (I) and quadrature (Q) (IQ) samples in the time-domain.

13. The apparatus of claim 12, wherein:
the processor is further configured to perform generating descriptors that define the detected regions in terms of frequency spans and time spans,
wherein the processor is configured to perform copying by copying gated energy content from the detected regions into the energy vector based on the descriptors, wherein the gated energy content is gated in frequency by the frequency spans of the descriptors and gated in time by the time spans of the descriptors, and
wherein the IQ samples are gated IQ samples that are gated in frequency and time.

14. The apparatus of claim 13, wherein the processor is further configured to perform copying by copying the gated energy content only from the detected regions and from limited guard bands that border the detected regions, but not from regions of the spectrogram that are outside of the limited guard bands.

15. The apparatus of claim 13, wherein the processor is further configured to perform copying by copying the gated energy content from the frequency spans and the time spans of the detected regions into contiguous segments of the energy vector.

16. The apparatus of claim 13, wherein the descriptors each includes minimum and maximum frequencies and start and stop times on the spectrogram that delimit a corresponding detected region of the detected regions.

17. The apparatus of claim 12, wherein the processor is further configured to perform:
estimating background noise based on spectrogram energy to produce a background noise estimate; and
determining the threshold level based on the background noise estimate and a target probability of false alarm for detecting the regions of the spectrogram that have the energy levels greater than the threshold level.

18. A non-transitory computer readable medium encoded with instructions that, when executed by a processor, cause the processor to perform:
receiving a reference frame of amplitude samples of a receive signal in a time-domain;
generating a spectrogram that includes energy content of the reference frame, represented by amplitude and phase, across frequency and time of the spectrogram;
detecting regions of the spectrogram that have energy levels greater than a threshold level to produce detected regions;
copying energy content from the detected regions into an energy vector; and
performing an Inverse Fourier transform (IFT) based on the energy vector to transform the energy vector into in-phase (I) and quadrature (Q) (IQ) samples in the time-domain.

19. The non-transitory computer readable medium of claim 18, further comprising instructions to cause the processor to perform:
generating descriptors that define the detected regions in terms of frequency spans and time spans,
wherein the instructions to cause the processor to perform copying include instructions to cause the processor to perform copying gated energy content from the detected regions into the energy vector based on the descriptors, wherein the gated energy content is gated in frequency by the frequency spans of the descriptors and gated in time by the time spans of the descriptors, and wherein the IQ samples are gated IQ samples that are gated in frequency and time.

20. The non-transitory computer readable medium of claim 19, wherein the instructions to cause the processor to perform copying include instructions to cause the processor to perform copying the gated energy content only from the detected regions and from limited guard bands that border the detected regions, but not from regions of the spectrogram that are outside of the limited guard bands.

* * * * *